United States Patent [19]

Grizante et al.

[11] Patent Number: 6,110,592

[45] Date of Patent: *Aug. 29, 2000

[54] METHOD FOR THE PREPARATION OF A POLYMERIC MIXTURE FOR CABLE INSULATORS AND COATINGS, POLYMERIC MIXTURE THUS PRODUCED AND CABLES CONTAINING IT

[75] Inventors: Redondo Eduardo Grizante, Monza; Antonio Zaopo; Luca Castellani, both of Milan, all of Italy

[73] Assignee: Pirelli Cavi S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 07/961,160

[22] Filed: Oct. 15, 1992

[30] Foreign Application Priority Data

Oct. 31, 1991 [IT] Italy .................................. MI91A2898

[51] Int. Cl.⁷ ........................... B32B 15/02; B32B 15/08; G02B 6/02
[52] U.S. Cl. ........................... 428/375; 428/379; 428/391; 385/123; 385/145; 525/425; 525/444; 525/446
[58] Field of Search ..................................... 428/391, 375, 428/379; 385/123, 145; 525/444, 425

[56] References Cited

U.S. PATENT DOCUMENTS 4,286,075  8/1981  Robeson et al. .
4,690,997  9/1987  Cella .......................................... 528/26

FOREIGN PATENT DOCUMENTS

| 850419 | 5/1977 | Belgium | C08L 75/04 |
| 0024245 | 8/1980 | European Pat. Off. | C08L 67/02 |
| 0024245 | 2/1981 | European Pat. Off. | C08L 67/02 |
| 0247465 | 3/1989 | European Pat. Off. | C08L 67/02 |
| WO8900756 | 1/1989 | WIPO | H01B 3/30 |

OTHER PUBLICATIONS

Chemicals Abstracts vol. 111, No. 20, Nov. 13, 1989, Columbus, Ohio, US; abstract No. 175763.

Primary Examiner—Patricia A. Short
Attorney, Agent, or Firm—Norris, McLaughlin & Marcus

[57] ABSTRACT

Method for the preparation of a polymeric mixture for cable insulators and coatings and sheaths for optic fiber cables; polymeric mixture thus produced and the cables containing it.

The method is characterized in that one completely mixes, up to the obtainment of a homogeneous composition, (i) from 50 to 80 parts (w/w) of a first thermoplastic polymer which is amorphous, highly resistant to flames and combustion, and consists of an aromatic polyester of isophthalic and terephthalic acid with bisphenol A, and (ii) from 20 to 50 parts (w/w) of at least a second thermoplastic polymer consisting of an elastomeric polyether-ester block copolymer, having a Shore D hardness greater than 50 and a Vicat softening point greater than 170° C., for a mixing time less than 10 minutes.

8 Claims, 6 Drawing Sheets

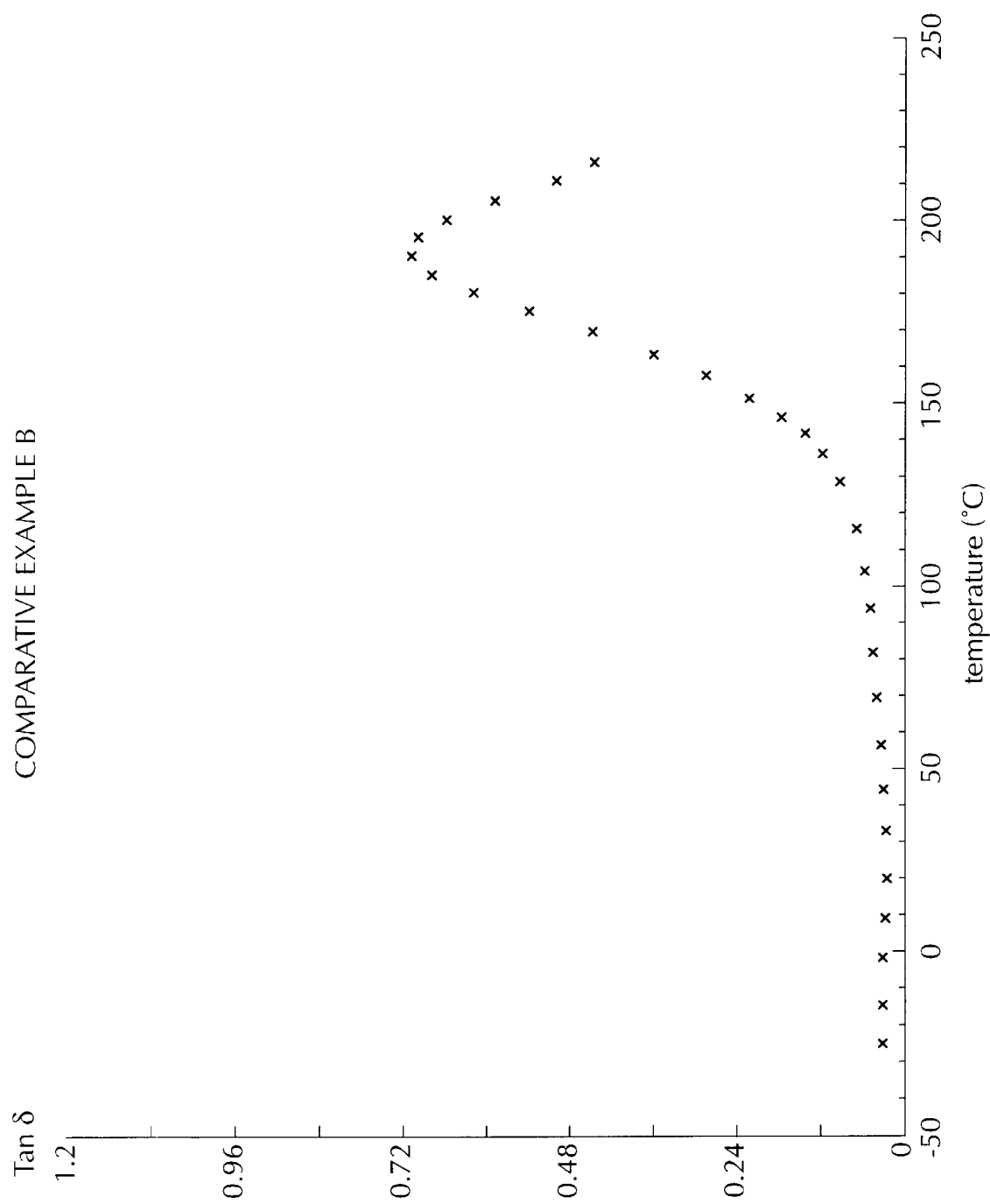

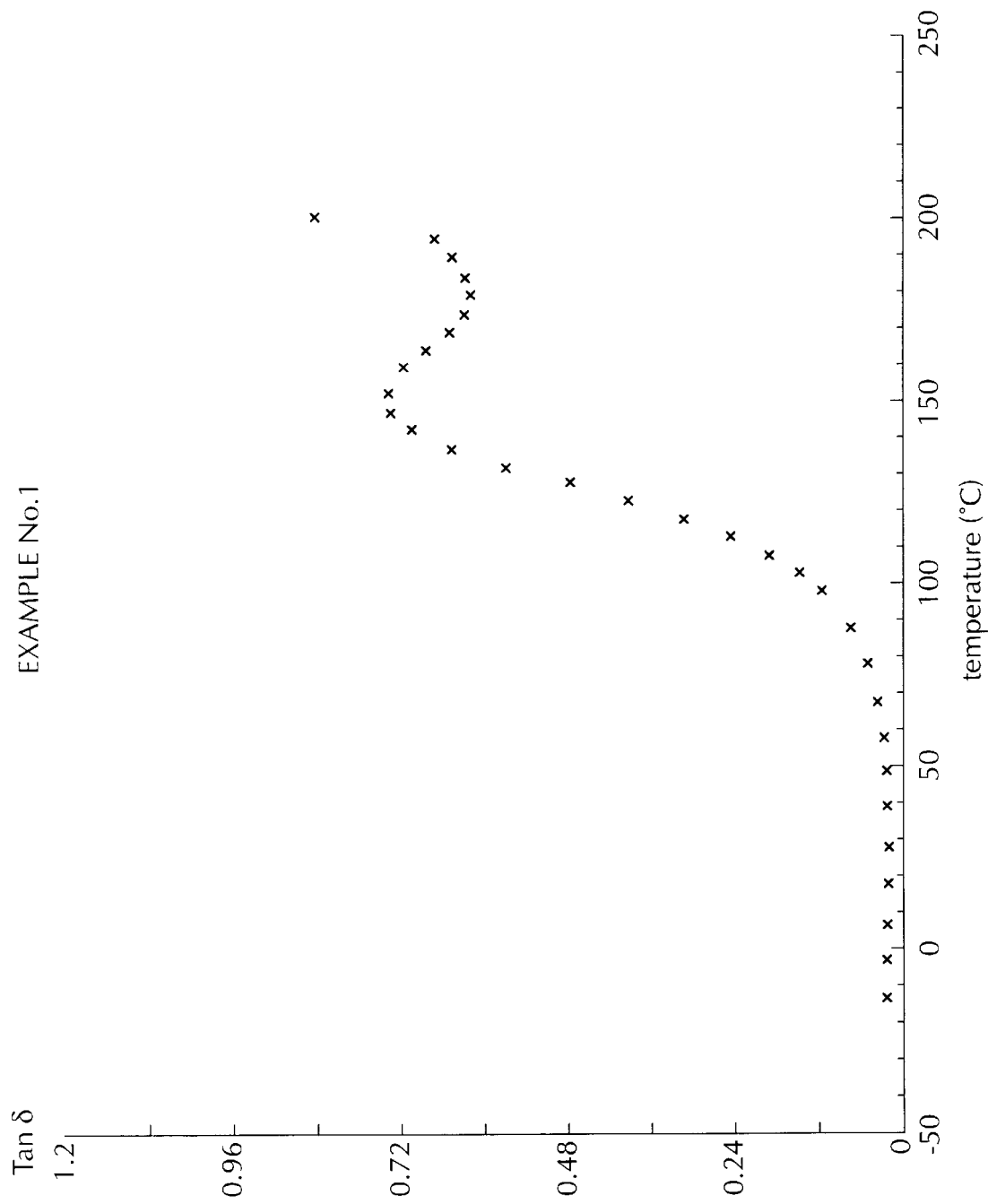

METHOD FOR THE PREPARATION OF A POLYMERIC MIXTURE FOR CABLE INSULATORS AND COATINGS, POLYMERIC MIXTURE THUS PRODUCED AND CABLES CONTAINING IT

DESCRIPTION

The present invention relates to a method for the preparation of a polymeric mixture for cable insulators and coatings, in particular for low voltage cables and for optic fiber sheaths, furthermore it relates to the polymeric mixture thus produced and to cables containing it. The term "mixture" as used in this disclosure refers to an aggregate of two or more polymers that are mixed but which are not chemically combined or chemically united.

It is known that for the various types of cable application and, in particular, for low voltage cables to be used in closed environments, in plants and public services such as, for example, undergrounds, railway cars, vehicles and the like it is desirable that their coating and/or their insulator possess, at the same time, good flexibility, i.e. a high ultimate elongation, at any temperature at which the cable might be exposed, constant elasticity in the temperature range wherein the cable is used, good resistance to flame propagation, in case of fire, with reduced release of toxic and corrosive gases and, for some applications, good resistance to oils, abrasion and the like.

In conventional cables resistant to flame propagation, the insulators and/or coatings or sheaths can be made of halogenated polymers, for instance PVC.

In fact halogenated polymers, when placed in contact with a flame, decompose with the development of great quantities of hydrogen halides which, being toxic and corrosive, must be avoided or reduced as much as possible.

U.S. Pat. No. 4,286,075 relates to molding compositions comprising a mixture of polyarylates together with thermoplastic polymers compatible therewith and, among these, polyether-ester block copolymers are also mentioned.

The values of the ultimate elongation of the molding polymeric mixtures exemplified in the U.S. Pat. No. 4,286,075 are low (12–38%).

Although the above document does not describe specific examples of mixtures comprising polyarylates and polyether-ester block copolymers and, therefore, neither the relevant values of the ultimate elongation, the results of experimental laboratory tests, reported further on in Table 1, carried out by the Applicant in conditions analogous to those reported in said document, give, for such mixtures too, low values in full agreement with those shown for the mixtures exemplified by said document.

Since the value of the ultimate elongation required for the mixtures of polymeric materials employed in the preparation of cable insulators and coatings or sheaths is certainly not lower than 50% and, preferably, must be higher than 100%, the U.S. Pat. No. 4,286,075 give rise to prejudices with regards to both the experimentation and the employment in the manufacture of cables of mixtures of polyarylates with polyether-ester block copolymers in spite of the very good resistance to flame propagation forseable for them.

Surprisingly, it has now been found that it is possible to obtain a cable coating and insulator having suitable extensibility and good resistance to flames from at least a polymeric mixture prepared by intimately mixing, up to the obtainment of a homogeneous composition, of (i) from 50 to 80 parts (w/w) of a first thermoplastic polymer which is amorphous, is highly resistant to flames and combustion, and consists of an aromatic polyester (polyarylate) of isophthalic and terephthalic acid with bisphenol A, and (ii) from 50 to 20 parts (w/w) of at least a second elastomeric thermoplastic polymer consisting of a polyether-ester block copolymer having a Shore D hardness greater than 50 and a Vicat softening point greater than 170° C., for a mixing time less than 10 minutes.

The present invention is essentially based on having found that mixtures of polyarylated compounds and polyether-ester block copolymers can be suitably employed in cables as long as they are prepared in the proper way and, in particular, that the mixing time is particularly important in obtaining a mixture which has an extensibility suitable for employment in cables.

Therefore it is an object of this invention to provide a method for preparing a polymeric mixture characterized in that one completely mixes, up to the obtainment of a homogeneous composition, (i) from 50 to 80 parts (w/w) of a first thermoplastic polymer which is amorphous, highly resistant to flames and combustion, and consists of an aromatic polyester of isophthalic and terephthalic acid with bisphenol A, and (ii) from 20 to 50 parts (w/w) of at least a second thermoplastic polymer consisting of an elastomeric polyether-ester block copolymer, having a Shore D hardness greater than 50 and a Vicat softening point greater than 170° C., for a mixing time less than 10 minutes.

Preferably the above time is less than five minutes, and still more preferably less than two minutes. In turn, the mixing temperature is preferably of from 260 to 290° C. Typical example of amorphous polyarylate, substantially not elastomeric and with high resistance to flames and combustion according to the present invention, is Ardel™ D-100 (Amoco Performance Products, Inc) prepared by polycondensation of bisphenol A with a substantially equimolar mixture of isophthalic and terephthalic acid or reactive derivatives thereof.

Examples of suitable elastomeric polyether-ester block copolymers are those formed by segments consisting of units of ethyleneterephthalate or tetramethyleneterephathalate and by segments consisting of a long chain of poly (alkylene ether)glycols whose end groups are esterified by phthalic acid.

Typical example of elastomeric polyether-ester block copolymers having a Shore D hardness greater than 50 and a Vicat softening point greater than 170° C. according to the present invention is Hytrel™ 5555 HS (E.I. du Pont de Nemours & Co., Inc.).

The polymeric mixture obtained according to the method of this invention has an extensibility of at least 50% in the range of the required working temperatures and shows good resistance to flame propagation (tested according to specification IEC 332-2, equivalent to specification NFF 16 101).

The mixture is therefore particularly suitable to be employed in mixtures for cable insulators and coatings, in particular for low voltage cables, optical fiber sheaths and the like. Moreover, said mixtures may also contain compounds capable of improving the resistance to oils (tested according to specification NFF 63 808).

As far as resistance to oils is concerned, it has been proved to be particularly useful adding, during the preparation of the polymeric mixture of this invention, a silicone etherimide copolymer; the quantity of the latter is preferably of from 15 to 70% (w/w) with respect to the total amount of the polymers. Typical example of such a silicone-etherimide copolymer is Siltem™ STM 1500 (General Electric Plastics).

Therefore, it is another object of this invention to provide a cable comprising a conductor, an insulator and/or a coating characterized in that at least one of said insulator and coating consists of a thermoplastic mixture comprising a polymeric mixture prepared according to the method of this invention as described above.

BRIEF DESCRIPTION OF THE DRAWINGS

FIG. 5 is a graph depicting the curve exhibited by comparative example b during a glass transition temperature test; and FIG. 6 is a graph depicting the curve exhibited by example 1 during a glass transition temperature test.

Figure 1:
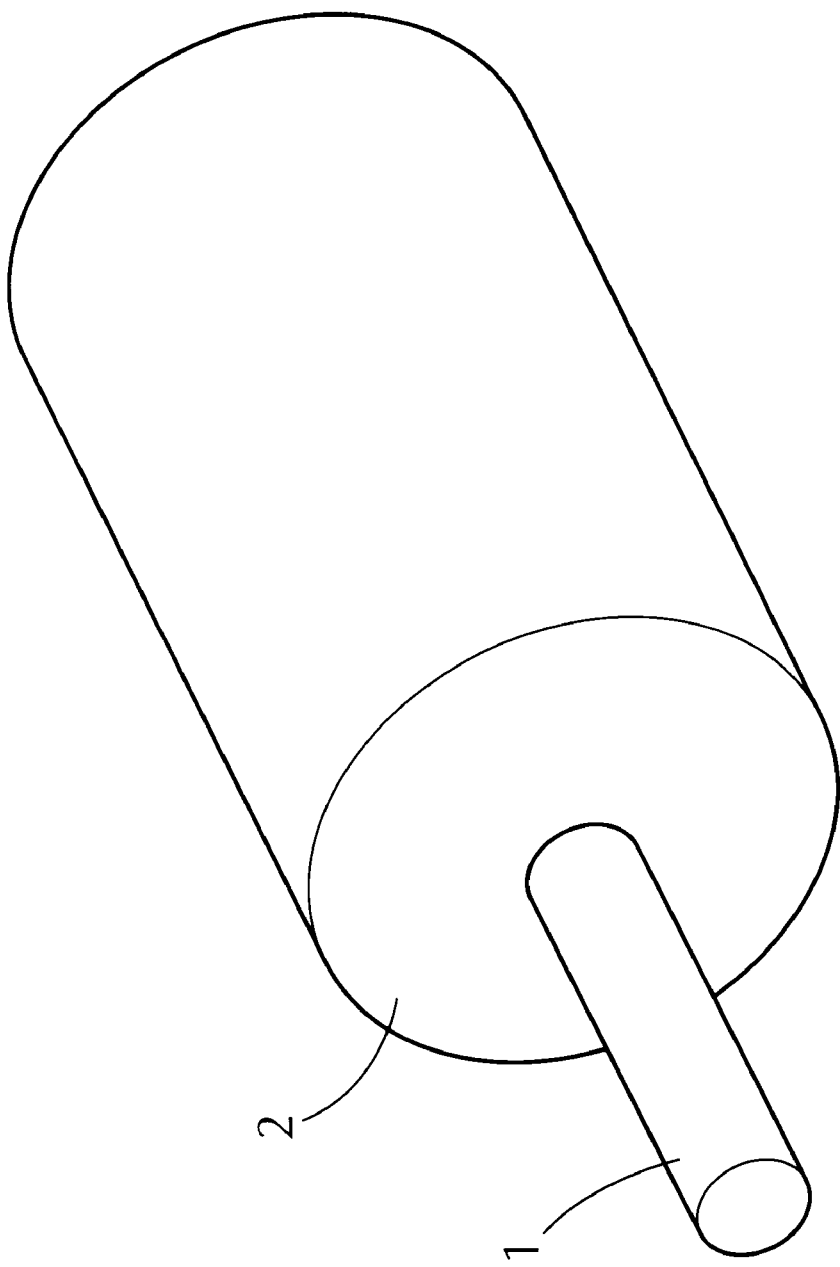
FIG. 1 is an embodiment of an electrical cable constructed in accordance with the present invention.
Figure 2:
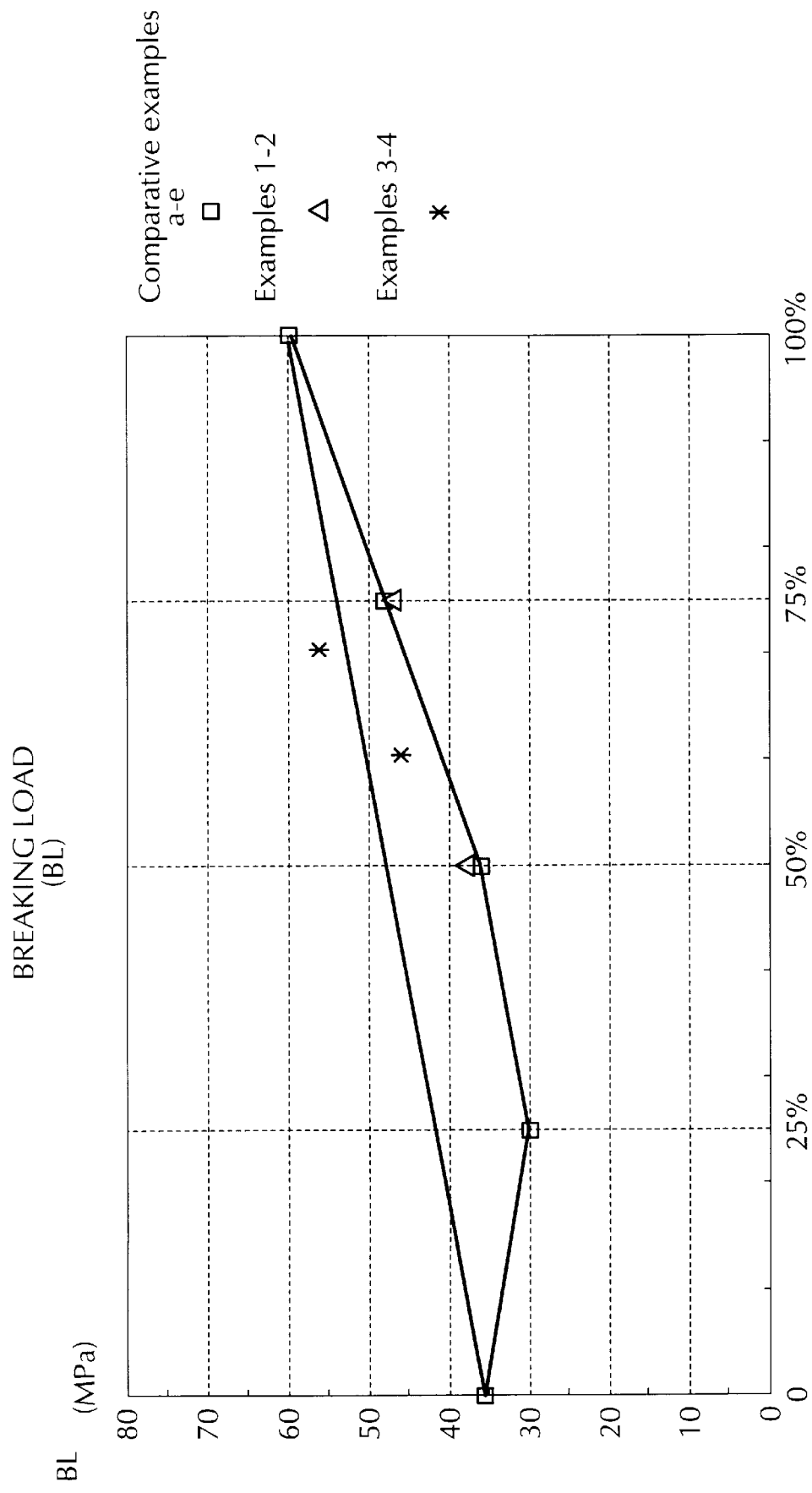
FIG. 2 is a graph depicting the breaking load values of comparative examples a–e and examples 1–4.
Figure 3:
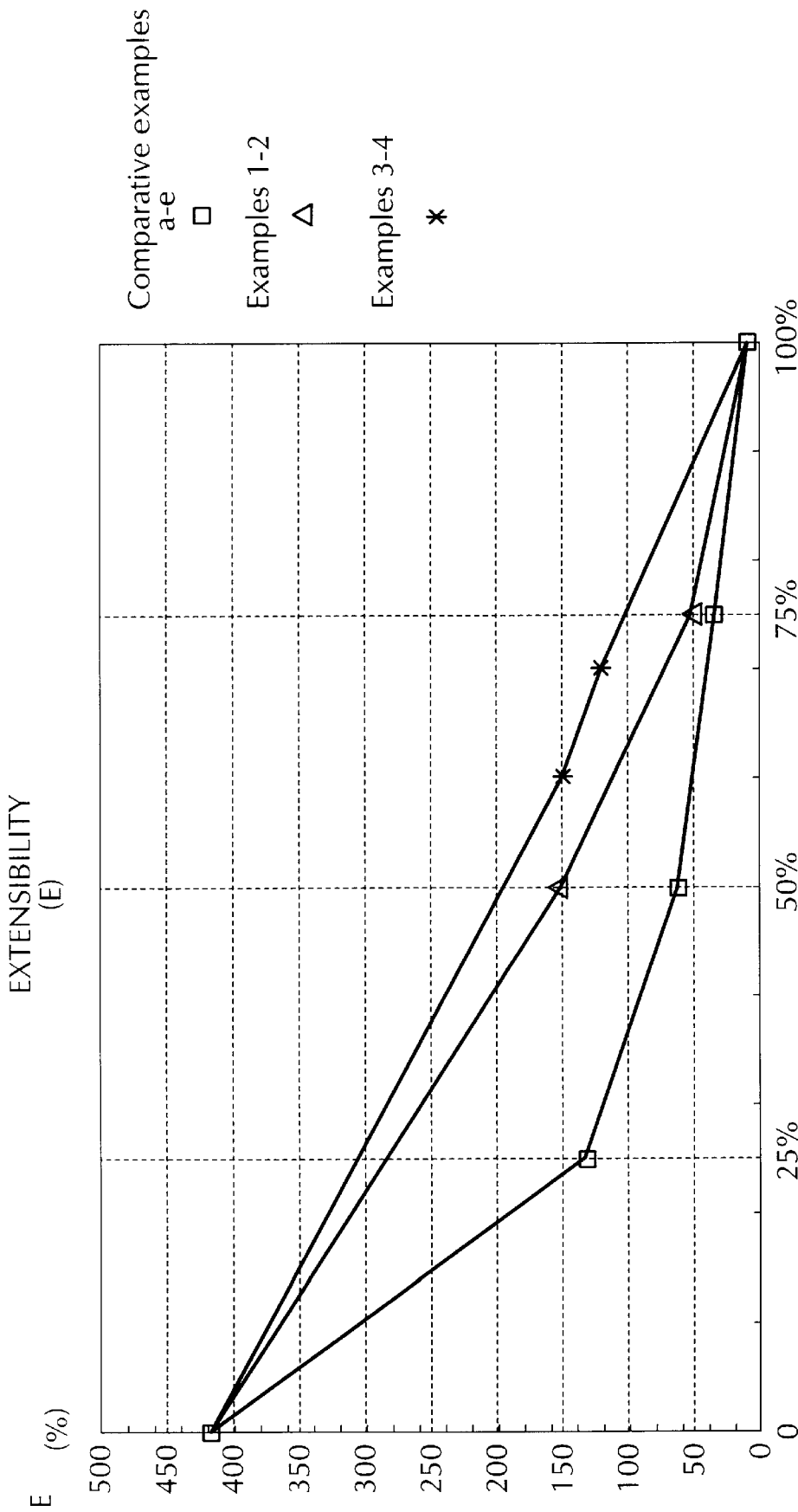
FIG. 3 is a graph depicting the extensibility values of comparative examples a–e and examples 1–4.
Figure 4:
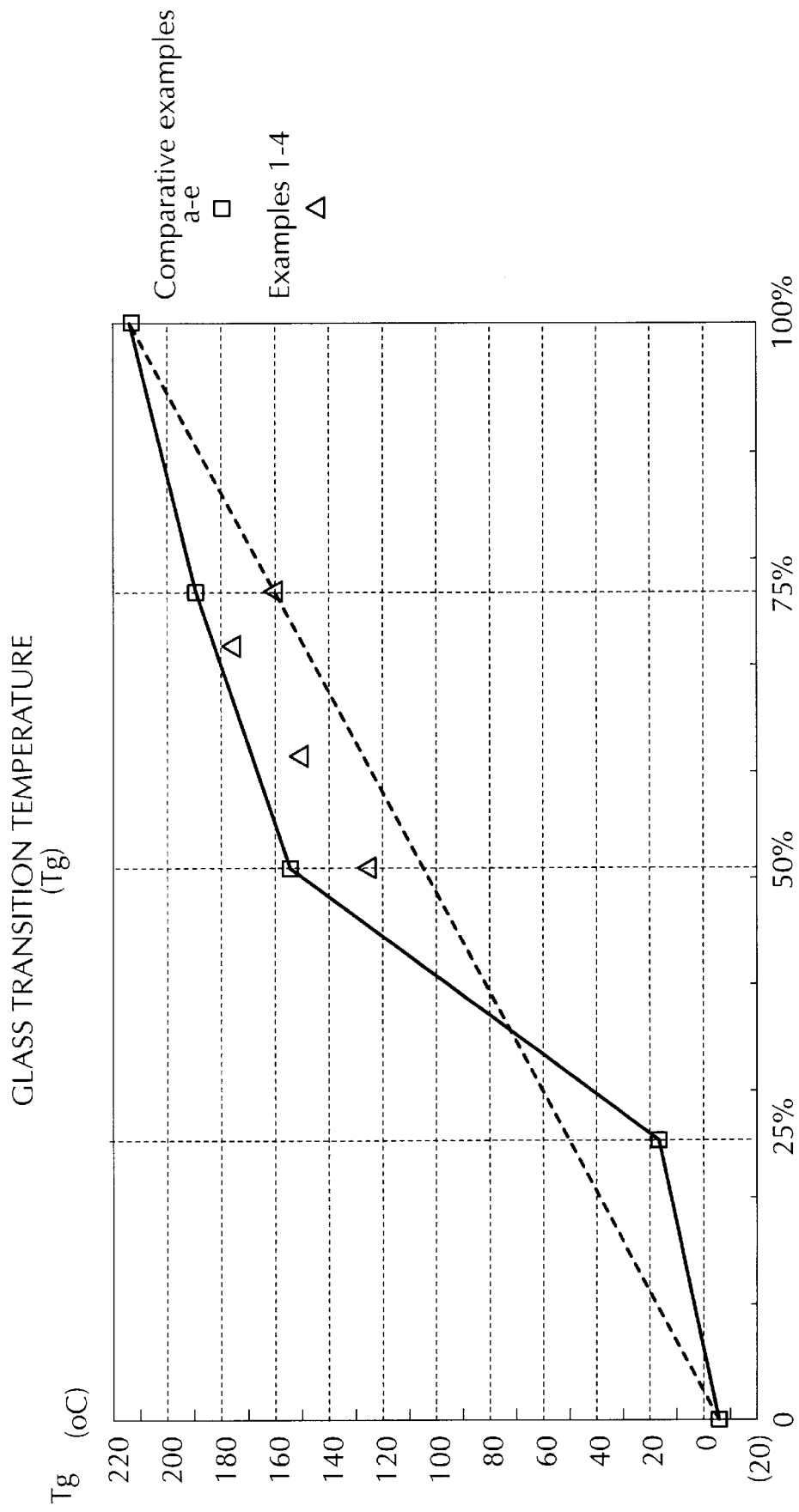
FIG. 4 is a graph depicting the glass transition temperature values of comparative examples a–e and examples 1–4.

An example of a cable that can be made with the polymeric mixture of this invention is shown in Table I, FIG. 1, where 1 is a conductor and 2 is an insulator or a sheath obtained by extrusion of a polymeric mixture of this invention.

When the cable of FIG. 1 is an electrical cable, 1 is an electrical conductor and 2 is the insulator. On the other hand, when the cable of FIG. 1 is an optical cable, 1 is the optical conductor comprising at least one optical fiber and 2 is the cable sheath.

As it is known (H. F. Giles, Jr. Modern Plastic Encyclopedia 1988, page 14), the mixtures of two or more polymers behave as a new material which exhibits uniform chemical and physical properties throughout its mass when the polymers forming it result to be reciprocally soluble; in this case the mixtures form a single-phase system and have one glass transition temperature value. In this case the chemical-physical properties of the single-phase mixture are essentially depending on the type and quantity of the polymers forming it; in other words, the above properties are essentially additive.

On the contrary, when two or more glass transition temperature values show that a single-phase system is not present, many properties of the mixture itself result much worse than those of the single-phase mixtures.

In the case of the above described mixtures of polyarylated compounds with polyether-ester block copolymers, there is miscibility for any percentage of the two components and a single-phase mixture is formed having only one glass transition temperature as shown in the tables below.

However, contrary to what one might expect, it has been shown that the formation of a single-phase mixture is not in itself sufficient to ensure the presence of the desired properties on the basis of the properties of the polymers forming the mixture. In fact, the polymeric mixtures of a polyarylated compound with a polyether-ester block copolymer prepared according to conventional techniques which involve mixing for 10 or more minutes, even though having a single glass transition temperature, do not exhibit the desired properties, at least as far as the ultimate elongation is concerned.

Since the ultimate elongation of the polymeric mixtures thus obtained is inadequate for the desired application, they would therefore have been excluded from further investigation had it not been surprisingly observed that this property is greatly influenced by the mixing time.

In fact, mixtures having the very same starting composition but different mixing times exhibit different values of ultimate elongation, as better shown below; e.g. for the mixtures of examples b (Table I) and 1 (Table II), whose curves of the glass transition temperature test are respectively shown in tables V and VI (showing the presence of a single glass transition temperature and therefore the presence of a single-phase system for both mixtures) the difference is such that the first polymeric mixture cannot be employed in the cable industry while the second one is perfectly suitable.

Although the reason why the above phenomenon occurs has not been extensively investigated, that is, if the different mixing conditions result in mixtures having different structures, or if one of the components of the mixtures undergoes some structural modification, in the course of the experiments carried out by the Applicant it has been seen that the mixtures obtained in the two conditions have constantly shown the above mentioned different properties.

It has also been seen that the mixtures obtained as described in the comparative examples a–e are brownish while those of the examples 1–4 and comparative examples f–i have a definitely lighter colour. This bring to the conclusion that the different conditions of the methods give in effect different materials.

The following examples are intended to illustrate this invention without, however, limiting it in any way.

COMPARATIVE EXAMPLES a–e

A polyarylated compound (Ardel™ D-100 by Amoco) was mixed, in 5 different ratios, with a polyether-ester block copolymer (Hytrel™ 5555 by Du Pont) in a Brabender mixer at 270° C., for 10 minutes.

The 5 mixtures thus obtained were molded by compression at 280° C., in plates having the following sizes: 200×200×1 mm.

From the plates, hand punched probes were made and on these probes the breaking load (BL) and extensibility (E) were tested according to the specifications CEI 20–34/1-1, corresponding to the international specifications IEC 811-1-1 under a traction rate of 50 mm/min.

Furthermore, the glass transition temperature values (Tg) were tested with a thermomechanic dynamic analyzer DMTA MK-II, by PL Thermal Sciences, Loughborrough U.K., at the frequency of 20 Hz.

The compositions of the 5 mixtures and the relevant tested values are shown in the following Table I where A is for Ardel™ D-100 and H for Hytrel™ 5555-HS and in the diagrams of the Tables II–IV.

TABLE I

| Example | A (w/w) | H (w/w) | BL (MPa) | E (%) | Tg (° C.) |
|---|---|---|---|---|---|
| a | 100 | 0 | 60 | 10 | 215 |
| b | 75 | 25 | 48 | 30 | 190 |
| c | 50 | 50 | 36 | 60 | 155 |
| d | 25 | 75 | 30 | 135 | 20 |
| e | 0 | 100 | 35 | 420 | −5 |

The data of Table I and the pertinent diagrams of Tables II–IV show that:

- the BL values are essentially additive (Table II);
- the E values increase in a non linear (Tabella III) and anti-synergic (antagonistic) way as the percentage of H increases;
- all the mixtures show only one Tg value (Table IV) thus proving the thermodynamic compatibility (miscibility) of the two polymers and therefore that it is possible to obtain polymeric mixtures stable in time.

EXAMPLES 1–2

Two mixtures having the same starting composition as in the comparative examples b and c were mixed in a continous Buss mixer type KKG 4.6-7 at 270° C. for times of from 30 seconds to 1 minute. From the two mixtures thus prepared, hand punched probes were made following the procedure described for the comparative examples e–a, and on these probes the values shown in Table II were found.

TABLE II

| Example No | A (w/w) | H (w/w) | BL (MPa) | E (%) | Tg (° C.) |
|---|---|---|---|---|---|
| 1 | 75 | 25 | 47 | 50 | 160 |
| 2 | 50 | 50 | 38 | 155 | 125 |

The data of Table II and the diagrams of Tables II–IV show that:
- the BL values do not show significant variations with respect to the corresponding mixtures of the comparative examples b and c;
- the E increase almost linearly; since the substantial difference between the method of the comparative examples b and c and that of the examples 1 and 2 is represented by the mixing times, it appears, according to the invention, that the different and unexpected trend of the values of E found on the samples prepared according to the examples 1 and 2 is to be attributed to the shorter mixing time;
- the values of Tg do not present significant variations with respect to the corresponding mixtures of the comparative examples b and c and that demonstrates that the mixing times of this examples 1 and 2, even though they are very short, are sufficient to obtain complete mixing of the two components;
- in particular, the value of E is fully suitable for the applications according to this invention.

EXAMPLES 3–4

The method of examples 1 and 2 was repeated, using the same type of mixer and the same mixing time, for preparing two mixtures having intermediate compositions with respect to those of examples 1 and 2.

The thus obtained mixtures were applied on a small tinned copper rope, 0.5 mm² in cross-section and 0.2 mm in thickness, using an extruder for tecnopolymers with diameter D=30 mm and length L =24D, while the mixtures were melted at 280° C.

On a sample of the small cable coating the values of BL, E and Tg shown in Table III were found.

TABLE III

| Example No | A (w/w) | H (w/w) | BL (MPa) | E (%) | Tg (° C.) |
|---|---|---|---|---|---|
| 3 | 70 | 30 | 56 | 120 | 185 |
| 4 | 60 | 40 | 46 | 150 | 150 |

The data of Table III and the diagrams of Tables II–IV show that:
- the values of III essentially keep to the same linear trend;
- the values of E are in accordance with those of the compositions of the examples 1 and 2;
- the values of Tg are consistent with those of the examples 1 and 2.

Moreover, on samples of small cables, trials of vertical flame propagation were carried out according to the specification IEC 332-2. The small cable prepared with the mixture of example 3 has passed the test while that of example 4 has not.

Therefore, the mixture of example 3 possesses intrinsic properties of non-flame-propagation and it does not require the addition of retardants such as, for instance, halogenated compounds.

COMPARATIVE EXAMPLES f–h

The procedure of examples 3–4 was repeated to prepare and evaluate three mixtures containing still Ardel™ D-100 but a different type of Hytrel (i.e. Hytrel 4068 having a Shore D hardness of 40 and a Vicat softening point of 195° C.)

The results are shown in Table IV where HL stands for Hytrel™ 4068.

TABLE IV

| Example No | A (w/w) | H (w/w) | BL (MPa) | E (%) | Tg (° C.) |
|---|---|---|---|---|---|
| f | 90 | 10 | 34 | 11 | 205 |
| g | 80 | 20 | 29 | 48 | 204 |
| h | 70 | 30 | 21 | 42 | 202 |

The data of Table IV show that the values of BL and E are unsatisfactory in spite of the fact that the values of Tg prove the complete thermodynamic compatibility between the two components A and HL.

COMPARATIVE EXAMPLE i

The procedure of examples 3–4 was repeated to prepare and evaluate a mixture containing still Ardel™ D-100 but a polyether-ester block copolymer having a hardness Shore D=57 and a Vicat softening point 127° C. (LOMOD™ B 250; by General Electric Plastics).

The results are shown in Table V where LD stands for LOMOD™ B 250.

TABLE V

| Example No | A (w/w) | LD (w/w) | BL (MPa) | E (%) | Tg (° C.) |
|---|---|---|---|---|---|
| i | 75 | 25 | 37 | 12 | 155 |

The data of Table V show that the value of BL is not satisfactory in spite of the fact that a single value for Tg proves the formation of a single-phase mixture.

EXAMPLE 5–7

The procedure of examples 3–4 was repeated to prepare and evaluate a cable coating prepared with a mixture containing Ardel™ D-100, Hytrel™ 5555-HS and Siltem™ STM 1500 (General Electric Plastics).

The results are shown in Table VI where SM stands for Siltem™ STM 1500, RO stands for the resistance to oils tested according to the specification NFC 32 024 and AB the resistance to abrasion tested according to the specification NFF 63 808, paragraph 5.5.2.5 (number of cycles required: more than 150).

TABLE VI

| Example | A (w/w) | H (w/w) | SM (w/w) | BL (MPa) | E (%) | Tg (° C.) | RO | AB number of cycles |
|---|---|---|---|---|---|---|---|---|
| 5 | 56 | 24 | 20 | 56 | 160 | 185 | passes | 440 |
| 6 | 63 | 27 | 10 | 47 | 140 | 190 | does not pass | 500 |
| 7 | 14 | 6 | 80 | 30 | 150 | 160 | passes | 140 |

The data of Table VI show that the values of BL are satisfactory in all three examples;

the resistance to oils is adequate for examples 5 and 7 but not for 6;

the resistance to abrasion is adequate for examples 5 and 6 while the mixture of example 7 does not pass the test.

So it appears that 20% of a silicone-etherimide copolymer, such as Siltem™ STM 1500, in the mixture is sufficient to give resistance to oils without jeopardizing the resistance to abrasion which falls to values unacceptable when the content of the above copolymer goes over 80.

What is claimed is:

1. A cable coating formed by a polymeric mixture comprising from 50 to 80 parts (w/w) of a first thermoplastic polymer which is amorphous, highly resistant to flames and combustion, and consists of an aromatic polyester of isophthalic and terephthalic acid with bisphenol A, and from 20 to 50 parts (w/w) of at least a second thermoplastic polymer consisting of an elastomeric polyether-ester block copolymer, having a Shore D hardness greater than 50 and a Vicat softening point greater than 170° C., said mixture having an ultimate elongation not lower than 50% when the amount of the second polymer is the lowest one and a higher ultimate elongation as the amount of said second polymer increases wherein said first thermoplastic polymer and said at least a second thermoplastic polymer are not chemically combined and said thermoplastic polymers are not cross-linked with themselves.

2. A cable coating according to claim 1 wherein the polymeric mixture also comprises from 15 to 70% (w/w), with respect to the total amount of the polymers, of a third polymer which is a silicone-etherimide copolymer wherein said third polymer is not chemically combined with said first or second thermoplastic polymer and said third polymer is not cross-linked with itself.

3. An electrical cable comprising a conductor and an insulator or a coating formed by a polymeric mixture, said polymeric mixture comprising from 50 to 80 parts (w/w) of a first thermoplastic polymer which is amorphous, highly resistant to flames and combustion, and consists of an aromatic polyester of isophthalic and terephthalic acid with bisphenol A, and from 20 to 50 parts (w/w) of at least a second thermoplastic polymer consisting of an elastomeric polyether-ester block copolymer, having a Shore D hardness greater than 50 and a Vicat softening point greater than 170° C., said mixture having an ultimate elongation not lower than 50% when the amount of the second polymer is the lowest one and a higher ultimate elongation as the amount of said second polymer increases wherein said fist thermoplastic polymer and said at least a second thermoplastic polymer are not chemically combined and said thermoplastic polymers are not cross-linked with themselves.

4. An electrical capsule according to claim 3, wherein the polymeric mixture also comprises from 15 to 70% (w/w), with respect to the total amount of the polymers, of a third polymer which is a silicone-etherimide copolymer wherein said third polymer is not chemically combined with said first or second thermoplastic polymer and said third polymer is not cross-linked with itself.

5. A sheath for optical cables comprising from 50 to 80 parts (w/w) of a first thermoplastic polymer which is amorphous, highly resistant to flames and combustion, and consists of an aromatic polyester of isophthalic and terephthalic acid with bisphenol A, and from 20 to 50 parts (wiw) of at least a second thermoplastic polymer consisting of an elastomeric polyether-ester block copolymer, having a Shore D hardness greater than 50 and a Vicat softening point greater than 170° C., said mixture having an ultimate elongation not lower than 50% when the amount of the second polymer is the lowest one and a higher ultimate elongation as the amount of said second polymer increases wherein said first thermoplastic polymer and said at least a second thermoplastic polymer are not chemically combined and said thermoplastic polymers are not cross-linked with themselves.

6. A sheath for optical cables according to claim 5, characterized in that the polymeric mixture also comprises from 15 to 70% (w/w), with respect to the total amount of the polymers, of a third polymer which is a silicone-etherimide copolymer.

7. An optical cable comprising at least an optical fiber and a sheath formed by a polymeric mixture, said polymeric mixture comprising from 50 to 80 parts (w/w) of a first thermoplastic polymer which is amorphous, highly resistant to flames and combustion, and consists of an aromatic polyester of isophthalic and terephthalic acid with bisphenol A, and from 20 to 50 parts (w/w) of at least a second thermoplastic polymer consisting of an elastomeric polyether-ester block copolymer, having a Shore D hardness greater than 50 and a Vicat softening point greater than 170° C., said mixture having an ultimate elongation not lower than 50% when the amount of the second polymer is the lowest one and a higher ultimate elongation as the amount of said second polymer increases wherein said first thermoplastic polymer and said at least a second thermoplastic polymer are not chemically combined and said thermoplastic polymers are not cross-linked with themselves.

8. An optical cable according to claim 7, characterized in that the polymeric mixture also comprises from 15 to 70% (w/w), with respect to the total amount of the polymers, of a third polymer which is a silicone-etherimide copolymer.

* * * * *